United States Patent [19]

Zboril

[11] 4,082,880
[45] Apr. 4, 1978

[54] PAPER-LIKE THERMOPLASTIC FILM

[75] Inventor: Vaclav George Zboril, Kingston, Canada

[73] Assignee: du Pont of Canada Limited, Montreal, Canada

[21] Appl. No.: 799,434

[22] Filed: May 23, 1977

Related U.S. Application Data

[63] Continuation of Ser. No. 642,054, Dec. 18, 1975, abandoned, which is a continuation-in-part of Ser. No. 499,215, Aug. 21, 1974, abandoned.

[30] Foreign Application Priority Data

Nov. 22, 1973 Canada ..................... 186508

[51] Int. Cl.$^2$ .................... B05D 3/00; B05D 7/00
[52] U.S. Cl. .................... 428/220; 264/209; 428/219; 428/323; 428/324; 428/332; 428/338; 428/339
[58] Field of Search ............. 428/220, 323, 324, 338, 428/363, 402, 910, 332, 339, 219; 264/209, 99, 210 R, 290, 289

[56] References Cited

U.S. PATENT DOCUMENTS

| | | | |
|---|---|---|---|
| 3,154,461 | 10/1964 | Johnson | 428/306 |
| 3,639,554 | 2/1972 | Hutt | 264/211 |
| 3,758,661 | 9/1973 | Yamamoto et al. | 260/42.46 |
| 3,845,180 | 10/1974 | Pinsky | 264/210 R |

FOREIGN PATENT DOCUMENTS

| | | | |
|---|---|---|---|
| 857,223 | 12/1970 | Canada | 264/290 |
| 846,254 | 7/1970 | Canada | 428/220 |
| 1,237,164 | 6/1971 | United Kingdom | 428/323 |

*Primary Examiner*—Lorraine T. Kendell

[57] ABSTRACT

A paper-like thermoplastic film and a process for making it are disclosed. The process involves extruding a mixture of (a) 70–98% by weight of a polyethylene having a maximum melt flow index of 5 decigrams per minute and (b) 2–30% by weight of inorganic lamellar filler particles, e.g., mica, the largest dimension of said particles being less than 150 microns, through a circular die, in the form of seamless tubing, continuously withdrawing the tubing from the point of extrusion, and expanding and simultaneously cooling the tubing while in the plastic formative state at a temperature above the melting temperature to a blow up ratio in the range of from 1.2:1 to 10:1.

18 Claims, 1 Drawing Figure

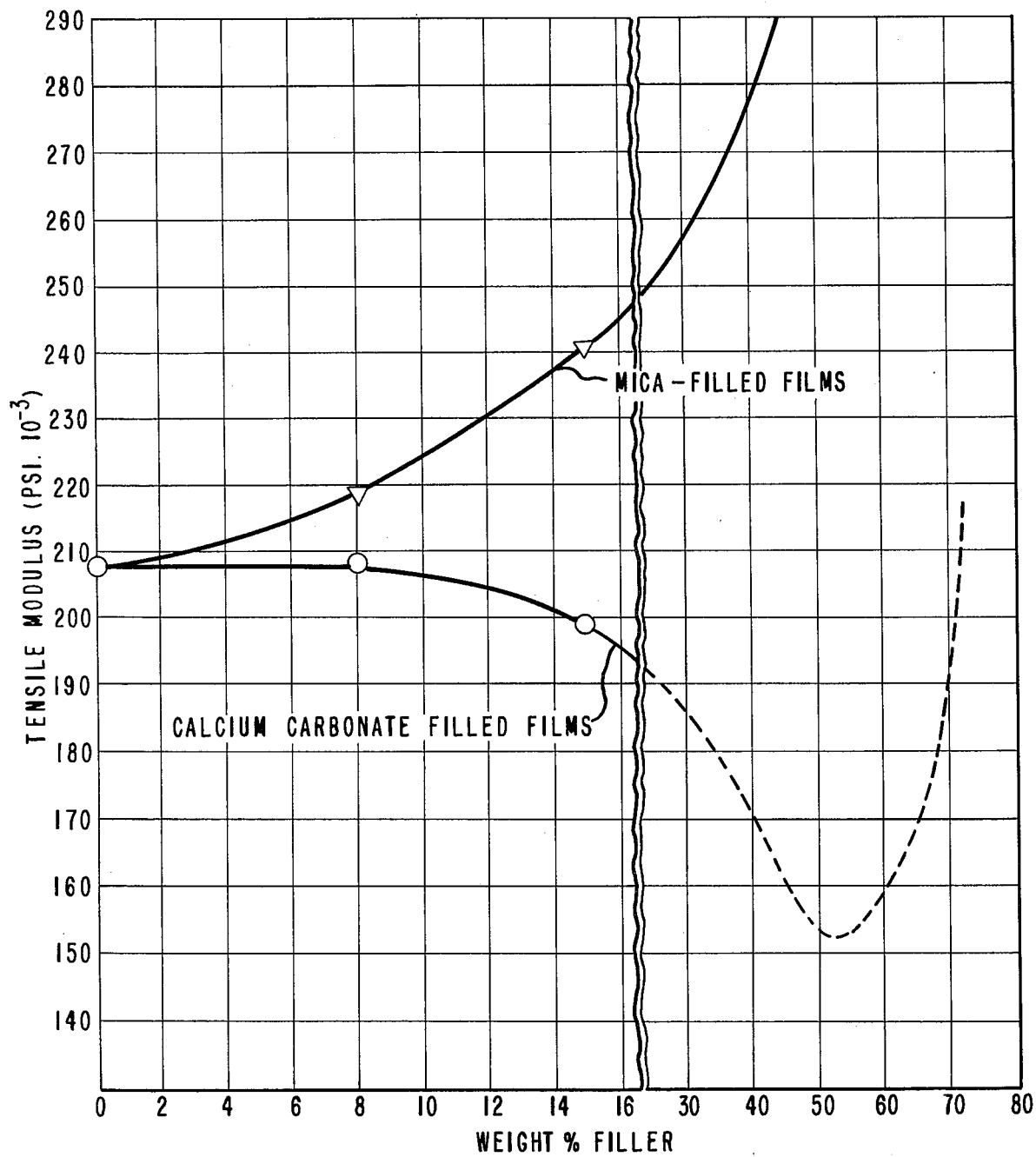

PAPER-LIKE THERMOPLASTIC FILM

This is a continuation, of application Ser. No. 642,054, filed Dec. 18, 1975 now abandoned, which is a continuation-in-part of application Ser. No. 499,215, filed Aug. 21, 1974, now abandoned.

The present invention relates to the production of paper-like thermoplastic films and more particularly to the production of such paper-like films from polyethylene containing inorganic fillers by extruding the film as a tube and thereafter expanding the tube using a mandrel or using gas pressure within the tube.

Paper-like thermoplastic films, particularly paper-like polyethylene films may be used to replace grease proof papers and high wet strength papers, e.g., in the packaging of butter and margarine and in separating layers of wet products.

Numerous attempts have been made in the past to produce paper-like thermoplastic films. Canadian Pat. No. 758,151 which issued May 2, 1967 to J. H. Gardner, discloses that polystyrene and a finely divided siliceous filler may be compounded with polyethylene and ethylene-vinyl copolymer accommodation agent and formed into a paper-like film by extruding the molten compound through an annular or a flat die. Canadian Pat. No. 909,474, issued Sept. 12, 1972 to Susuki et al., discloses a process for producing paper-like film by (a) mixing a polyolefin with up to 70% by weight in total of at least one filler selected from gypsum, calcium sulfate hemihydrate and soluble anhydrite, (b) forming the mixture into a sheet, (c) contacting the sheet with water, thereby hydrating any calcium sulfate hemihydrate or anhydrite near the surface of the sheet, and (d) drying the sheet. U.S. Pat. No. 3,154,461 to Johnson discloses a polymeric film and method of forming the same in which polymeric material containing a particulate, such as mica or calcium carbonate, is biaxially oriented at above the second order transition temperature and below the melting point in a separate operation after the polymer is extruded into film form.

The production of a paper-like film of the composition disclosed by Gardner has the disadvantage that it is very difficult to extrude a thin film of this composition having balanced properties, through a circular die and thereafter to expand the extruded tube using gas pressure within the tube or a mandrel. The paper-like film of Susuki cannot be made by a direct extrusion process, therefore calandering must be used to produce the film. The film of Johnson, unlike the film of the instant invention, has a matte-finish and, in a preferred embodiment, is opaque and has void spaces.

Surprisingly it has now been found that the above disadvantages may be overcome and that a thin voidless thermoplastic film which has paper-like properties may be produced by mixing a quantity of inorganic lamellar filler particles with a polyethylene and extruding the mixture from a melt through a circular die and thereafter expanding the extruded tube while still in the plastic formative state using a mandrel or using gas pressure within the tube.

Accordingly, the present invention provides a paper-like thermoplastic film having a thickness of from 0.3 mil to 10 mil, said film having been made by a process involving extrusion of the film followed by biaxial stretching of the film while in the plastic formative state from a mixture of a. 70–98% by weight of a polyethylene having a maximum melt flow index of 5 decigrams per minute, b. 2–30% by weight of inorganic lamellar filler particles, the largest dimension of said particles being less than 150 microns.

In a preferred embodiment, the ratio of the Elmendorf tear of the paper-like film in the machine direction to the Elmendorf tear of the film in the transverse direction is in the range of from 1:2 to 1.5:1. The Elmendorf tear of the film is measured according to the procedures of A.S.T.M. D-1922.

The present invention also provides a process for producing a paper-like thermoplastic film having a thickness of from 0.3 mil to 10 mil comprising the steps of extruding a mixture of a. 70–98% by weight of a polyethylene having a maximum melt flow index of 5 decigrams per minute, b. 2–30% by weight of inorganic lamellar filler particles, the largest dimension of said particles being less than 150 microns, through a circular die, in the form of a seamless tubing, continuously withdrawing the tubing from the point of extrusion, expanding and simultaneously cooling the tubing while in the plastic formative or molten state at a temperature above the solidification or melting temperature to a blow up ratio in the range of from 1.2:1 to 10:1 and thereafter continue cooling of the expanded tubing to a temperature below the solidification temperature. The tubing may be expanded by maintaining a gas pressure within the tubing, e.g., as described in Canadian Pat. No. 460,963, issued Nov. 8, 1949 to Fuller, or by passing the tubing over a mandrel, e.g., as described in Canadian Pat. No. 893,216, issued Feb. 15, 1972 to Bunga and Thomas, or by other means known in the art.

The term "blow up ratio" as used herein means the ratio of the diameter of the expanded film tubing to the diameter of the circular die.

The term "polyethylene" as used herein means ethylene homopolymers or co-polymers made of ethylene and 1-olefins e.g., butene-1.

Any film-forming polyethylene having a maximum melt flow index of about 5 decigrams per minute may be used in accordance with the present invention. However, the preferred polyethylene has a melt flow index in the range of from 0.1 to 1 decigrams per minute and a density in the range of 0.945 to 0.970 grams per cubic centimeter. The melt flow index of the polyethylene is measured according to the procedures of A.S.T.M. D-1238.

The inorganic lamellar filler particles used in accordance with the invention should have a largest dimension (diameter) of less than about 150 microns and a minimum particle diameter to particle thickness ratio of about 5:1. It is desirable that the particle diameter to particle thickness ratio be as large as is practical, e.g., as large as 50 to 100:1. Examples of suitable inorganic lamellar fillers which may have the above characteristics are mica, talcum, kaolin and wollastonite.

A preferred filler is wet ground mica present in the range of from 5 to 15% by weight of the total mixture and having the following particle size characteristics: (1) a weight median particle size of about 12 microns; and (2) less than 0.2% of the particles being larger than 44 microns i.e., being retained on a 325 mesh (U.S. Sieve Series) screen. Another preferred filler is micaceous talcum present in the range of from 5 to 20% by weight of the total mixture and having the following particle size characteristics: (1) a weight median particle size of about 6 microns; (2) 0.2 to 0.4% of the particles being larger than 44 microns i.e., being retained on a 325 mesh (U.S. Sieve Series) screen; (3) approximately 6% by weight of the particles being larger than 20 microns; and (4) approximately 30% by weight of the particles being larger than 10 microns.

Other additives such as colouring pigments, antioxidants, antistatic agents, extrusion aids, etc. may be incorporated with polyethylene and inorganic lamellar filler particles in the mixtures from the paper-like films of the present invention are extruded.

The mixture of polyethylene, inorganic lamellar filler particles and other additives used to make paper-like thermoplastic film according to the present invention may be blended by known techniques and extruded through a circular die, in the form of seamless tubing, as hereinbefore described. The circular die may have a die gap in the range of 5 mil to 100 mil, the preferred die gap being in the range of from 15 mil to 40 mil. Paper-like films according to the present invention having a thickness in the range of 0.2 mil to 10 mil may be obtained by extruding the above mixture from the above circular dies at blow-up ratios in the range of from 1.2:1 to 10:1, the preferred blow-up ratios being in the range of 2.5:1 to 5:1.

Attempts to form films less than about 3.5 mils in thickness, from mixtures of polypropylene and inorganic lamellar fillers, by a process in which the mixture is extruded from a melt through a circular die and thereafter expanding the extruded tube in the plastic formative state have been unsuccessful. Moreover films of the aforementioned filled polypropylene are not paper-like as are the filled polyethylene films of the present invention.

The paper-like film of the present invention, as compared to unfilled polyethylene film, has increased stiffness, improved crease retention, increased bulkiness, improved texture, increased tensile modulus of elasticity, and more nearly balanced Elmendorf tear in the machine direction and the transverse direction. Compared to $CaCO_3$ filled (up to 20 to 30% of the total mixture being $CaCO_3$) polyethylene film, the paper-like film of the present invention is equivalent in crease retention and is superior in the above other properties. For example, films containing $CaCO_3$ show no change or a decrease in tensile modulus of elasticity compared to unfilled polyethylene film while films containing lamellar fillers show an increase in tensile modulus. Comparisons are shown below, in Table I, and in the graph, for films produced from a broad molecular weitht distribution polyethylene with a melt flow index of 0.75 decigrams per minute at a blow-up ratio of 4:1.

Moreover, in contrast to the above $CaCO_3$ filled polyethylene film, the paper-like film of the present invention can be extruded through a circular die, in the form of seamless tubing, and thereafter, expanded almost as easily as can unfilled polyethylene film. The tensile modulus of elasticity is measured according to the procedures of A.S.T.M. D-1238.

BRIEF DESCRIPTION OF THE DRAWING

The graph shows comparisons of tensile modulus for mica-filled films and calcium carbonate-filled films, based on weight % filler, made according to this invention.

The graph shows that films containing calcium carbonate differ qualitatively from films containing mica as to tensiled modulus. The films depicted in such graph were prepared by mixing ground calcium carbonate or mica having a weight medium particle size of 6 microns with high density polyethylene and by blowing or expanding extruded tubing from this mixture while in the plastic molten state at a temperature above the melting temperature in a one-step process at a blow-up ratio of 4 to 1. The films so prepared were 1.6 to 2 mils thick.

The graph illustrates the effect of percent filler of these materials on tensile modulus. It is seen that the tensile modulus of the calcium carbonate-filled films decreases with filler loading coating. The mica-filled films, on the other hand, exhibit a steady increase in tensile modulus with the filler loading.

The dotted part of the curve is a trend observed with pressed plaques containing up to 70% weight percent calcium carbonate. It is reiterated that polyethylene containing more than 30% weight calcium carbonate cannot be converted by blown-film techniques directly into film.

Table I

| Filler | Concentration (wt. %) | Tensile Modulus (psi × $10^{-3}$) |
|---|---|---|
| None | — | 208 |
| $CaCO_3$ | 8 | 208 |
| $CaCO_3$ | 15 | 199 |
| Mica | 8 | 218 |
| Mica | 15 | 241 |

The following Examples further illustrate the present invention without limiting its scope.

The following Examples illustrate the present invention without limiting its scope.

EXAMPLE 1

Ground calcium carbonate particles substantially spherical in shape, having a weight median particle size of 6 microns with less than 0.2% of the particles being larger than 250 mesh (U.S. Sieve Series) and having been treated with stearates, were compounded from a dry blend with linear polyethylene having a specific gravity of 0.96 grams per cubic centimeter, a melt flow index of 0.75 decigrams per minute and a broad molecular weight distribution, in a twin screw extruder to a concentrate containing 50 wt. % of the filler. This concentrate was dry blended with more of the same linear polyethylene to a resultant concentration of 39% by weight filler. A film was cast from this mixture. The film could be drawn to a minimum thickness of 2.5 mil. The tensile modulus of elasticity of the filled film was measured and found to be 118,000 psi in comparison to the tensile modulus of elasticity of the base resin film of 120,000 psi. In order for a filler to be effective in producing a paper-like film from polyethylene, it needs to provide (besides the other paper-like properties discussed hereinbefore) a substantial increase in the tensile modulus of the film. The above result indicates, therefore, that the substantially spherical-shaped calcium carbonate particles were ineffective in producing a paper-like film even at a level of $CaCO_3$ which interferred with the forming and stretching of the film.

EXAMPLE 2

A linear polyethylene having a specific gravity of 0.96 grams per cubic centimeter, a melt flow index of 5 decigrams per minute and a narrow molecular weight distribution was compounded with 39% CaCO₃ (as defined in Example 1) by the same method as used in Example 1. A film was cast from this mixture. The film could be drawn to a minimum thickness of 2 mil. An attempt to produce film from this mixture in a blown process failed because of the low melt strength of the blend.

EXAMPLES 3 TO 16

Mixtures of various linear polyethylenes with various fillers were prepared by the tecniques described in Example 1. Each of these mixtures was extruded into film in a blown film process. A number of parameters and characteristics of the resultant films are given in Table II as Example 3 to Example 16 inclusive. The various linear polyethylenes used for the above mixtures each had a specific gravity of about 0.96 grams per cubic centimeter.

comparison of Examples 15 and 16, indicates that as little as 2.5% by weight of lamellar filler particles added to a polyethylene may reduce the ratio of the transverse direction Elmendorf tear to the machine direction Elmendorf tear of the film blown therefrom from about 18:1 down to about 1.5:1.

A comparison of examples 3 and 4 with examples 5 and 7, indicates that in order for thin and stiff films, e.g., 1 mil thick film with a tensile modulus of elasticity of about 250,000 psi., to be extruded, a filler having lamellar filler particles must be used. The amount of amorphous (CaCO₃) filler required to give the desired stiffness to the film is so great that the melt cannot be drawn down to a thin film.

I claim:

1. A paper-like, voidless, thermoplastic film having a thickness of from 0.3 mil to 10 mil, said film having been made by a process consisting essentially of the steps of Table II

| | Polyethylene | | Filler | | Drawability (i.e. Minimum Film Thickness** Attainable) (mil.) | Film Characteristics | | | | |
|---|---|---|---|---|---|---|---|---|---|---|
| Example No. | Melt Flow Index (Decigrams per min.) | Molecular Weight Distribution | Type* | % by weight | | Thickness (mil.) | Tensile Modulus of Elasticity psi $\times 10^{-3}$ | Elmendorf Tear (gms/mil) | | Blow up Ratio |
| | | | | | | | | Machine dir. | Transverse dir. | |
| 3 | 3.5 | Medium | CaCO₃ | 20 | <1.4 | 1.8 | 174 | 18.3 | 438 | 1.6 |
| 4 | 3.5 | Medium | CaCO₃ | 30 | 1.4 | 1.6 | 223 | 12.2 | 209 | 1.6 |
| 5 | 2.3 | Medium | Mica | 13.5 | <0.4 | 1.7 | 247 | — | — | 1.6 |
| 6 | 2.3 | Medium | Talcum | 20 | — | 1.7 | 325 | — | — | 1.6 |
| 7 | 2.3 | Medium | Talcum | 15 | <0.3 | 1.6 | 295 | — | — | 1.6 |
| 8 | 2.3 | Medium | Kaolin | 15 | <0.4 | 1.6 | 233 | — | — | 1.6 |
| 9 | 2.3 | Medium | Wollastonite | 15 | <0.4 | 1.6 | 198 | — | — | 1.6 |
| 10 | 2.3 | Medium | Mica | 6 | <0.4 | 1.8 | 270 | — | — | 3.0 |
| 11 | 2.3 | Medium | Mica | 13.3 | <0.4 | 1.8 | 363 | — | — | 3.0 |
| 12 | 1.0 | Narrow | Mica | 10 | — | 2.6 | 227 | 21 | 22 | 3.0 |
| 13 | 0.75 | Broad | Mica | 10.6 | — | 1.6 | 297 | — | — | 3.1 |
| 14 | 0.4 | Broad | Mica | 5 | — | 2.0 | 246 | 21 | 34 | 3.0 |
| 15 | 0.4 | Broad | Mica | 2.5 | — | 2.0 | 223 | 23 | 36 | 3.0 |
| 16 | 0.75 | Broad | Nil | — | — | 2.6 | 210 | 21 | 382 | 3.0 |

*CaCO₃-particles substantially spherical in shape, weight median particle size of about 6 microns, less than 0.2% of particles larger than 350 mesh (U.S. Sieve Series)-treated with stearates.
Mica-lamellar particles with a weight median size of 12 microns, less than 0.2% of particles larger than 44 microns i.e., being retained on a 325 mesh (U.S. Sieve Series) screen.
Talcum-lamellar particles with a weight median size of about 6 microns, 0.2–0.4% of the particles larger than 44 microns, i.e., being retained on a 325 mesh (U.S. Sieve Series)-approximately 6% of particles larger than 20 microns and approximately 30% larger than 10 microns.
Kaolin-lamellar particles with a weight median size of less than 10 microns.
Wollastonite-lamellar particles with a weight median size of about 3 microns.
**Film thickness was measured according to th procedures of A.S.T.M. E-252 (Appendix 3).

It is apparent from Examples 3, 4 and 5 that the lamellar mica filler in the amount of 13.5% by weight increases the tensile modulus of elasticity of the blown film more than 20 or 30% by weight of the calcium carbonate filler.

In the five fillers used in the Examples, the ratio of the particle diameter to its thickness decreases in the order, mica ≧ talcum > kaolin > wollastonite > CaCO₃ = 1. Using the tensile modulus of elasticity as the criterion, it can be seen from examples 5, 6, 7, 8, 9 and 3 that the effectiveness of the fillers follows a similar order.

A comparison of examples 5 and 11 indicates that a film blown at a blow-up ratio of 3 manufactured from polyethylene filled with 13.5% by weight lamellar mica filler particles has a much higher tensile modulus of elasticity than a film blown from the same material at a blow-up ratio of 1.6.

Examples 10 to 16 inclusive demonstrate the effect of polyethylene type and filler loading on the tensile modulus of elasticity and on Elmendorf tear in the machine direction and in the transverse direction. Example 12 demonstrates that films having balanced Elmendorf tear (i.e., with the transverse direction tear approximately equal to the machine direction tear) may be obtained. A extruding a mixture of
  a. 70–98% by weight of a polyethylene having a maximum melt flow index of 5 decigrams per minute, and a density in the range of 0.945 to 0.970 grams per cubic centimeter, and
  b. 2–30% by weight of inorganic lamellar filler particles, the largest dimension of said particles being less than 150 microns and said particles having a minimum particle diameter to particle thickness ratio of about 5:1,
through a circular die, in the form of a seamless tubing, continuously withdrawing the tubing from the point of extrusion, expanding and simultaneously cooling the tubing while in the plastic formative state to a blow up ratio in the range of from 1.2:1 to 10.1.

2. The film of claim 1 wherein the ratio of the Elmendorf tear of said film in the machine direction to the Elmendorf tear of said film in the transverse direction is in the range of from 1:2 to 1.5:1.

3. The film of claim 1 wherein the polyethylene has a melt flow index in the range of from 0.1 to 1 decigrams per minute.

4. The film of claim 2 wherein the polyethylene has a melt flow index in the range of from 0.1 to 1 decigrams per minute.

5. The film of claim 3 wherein the inorganic lamellar filler particles are mica.

6. The film of claim 4 wherein the inorganic lamellar filler particles are mica.

7. The film of claim 3 wherein the inorganic lamellar filler particles are talcum.

8. The film of claim 4 wherein the inorganic lamellar filler particles are talcum.

9. The film of claim 3 wherein the inorganic lamellar particles are mica present in the range of from 5 to 15% by weight of the mixture.

10. The film of claim 4 wherein the inorganic lamellar particles are mica present in the range of from 5 to 15% by weight of the mixture.

11. The film of claim 3 wherein the inorganic lamellar filler particles are talcum present in the range of from 5 to 20% by weight of the mixture.

12. The film of claim 4 wherein the inorganic lamellar filler particles are talcum present in the range of from 5 to 20% by weight of the mixture.

13. The film of claim 3 wherein the inorganic lamellar filler particles are mica present in the range of from 5 to 15% by weight of the mixture, wherein the average size of the particles is about 12 microns and wherein less than 0.2% by weight of the particles are larger than 44 microns.

14. The film of claim 4 wherein the inorganic lamellar filler particles are mica present in the range of from 5 to 15% by weight of the mixture, wherein the average size of the particles is about 12 microns and wherein less than 0.2% by weight of the particles are larger than 44 microns.

15. The film of claim 3 wherein the inorganic lamellar filler particles are talcum present in the range of from 5 to 20% by weight of the mixture, wherein the average size of the particles is about 6 microns and wherein 0.2–0.4% by weight of the particles are larger than 44 microns.

16. The film of claim 4 wherein the inorganic lamellar filler particles are talcum present in the range of from 5 to 20% by weight of the mixture, wherein the average size of the particles is about 6 microns and wherein 0.2–0.4% by weight of the particles are larger than 44 microns.

17. A process for producing a paper-like thermoplastic film having a thickness of from 0.3 mil to 10 mil, consisting essentially of the steps of extruding a mixture of
   a. 70–98% by weight of a polyethylene having a maximum melt flow index of 5 decigrams per minute, and a density in the range of 0.945 to 0.970 grams per cubic centimeter, and
   b. 2–30% by weight of inorganic lamellar filler particles, the largest dimension of said particles being less than 150 microns and said particles having a minimum particle diameter to particle thickness of about 5:1, through a circular die, in the form of a seamless tubing, continuously withdrawing the tubing from the point of extrusion, expanding and simultaneously cooling the tubing while in the plastic molten state at a temperature above the solidification temperature to a blow up ratio in the range of from 1.2:1 to 10:1.

18. The process of claim 17 wherein the blow up ratio is in the range of from 2.5:1 to 5:1.

* * * * *

UNITED STATES PATENT AND TRADEMARK OFFICE
CERTIFICATE OF CORRECTION

PATENT NO. : 4,082,880
DATED : April 4, 1978
INVENTOR(S) : Vaclav George Zboril

It is certified that error appears in the above-identified patent and that said Letters Patent are hereby corrected as shown below:

Column 3, line 62, "A.S.T.M. D-1238" should read -- A.S.T.M. D-882 --.

Signed and Sealed this

Twenty-sixth Day of September 1978

[SEAL]

Attest:

RUTH C. MASON
Attesting Officer

DONALD W. BANNER
Commissioner of Patents and Trademarks